Sept. 23, 1969　　　G. F. MÜLLER　　　3,468,174
GEARING DEVICE

Filed Oct. 6, 1967　　　　　　　　　　6 Sheets-Sheet 1

INVENTOR
GERHARD FRIEDRICH MÜLLER
BY Hane and Baxley
ATTORNEYS

Sept. 23, 1969    G. F. MÜLLER    3,468,174
GEARING DEVICE

Filed Oct. 6, 1967    6 Sheets-Sheet 4

INVENTOR
GERHARD FRIEDRICH MÜLLER
BY Hane and Baxley
ATTORNEYS

Sept. 23, 1969  G. F. MÜLLER  3,468,174
GEARING DEVICE

Filed Oct. 6, 1967  6 Sheets-Sheet 5

INVENTOR
GERHARD FRIEDRICH MÜLLER
BY Hane and Bailey
ATTORNEYS

Sept. 23, 1969  G. F. MÜLLER  3,468,174
GEARING DEVICE

Filed Oct. 6, 1967  6 Sheets-Sheet 6

INVENTOR
GERHARD FRIEDRICH MÜLLER
BY Hane and Bayley
ATTORNEYS

United States Patent Office 3,468,174
Patented Sept. 23, 1969

3,468,174
GEARING DEVICE
Gerhard Friedrich Müller, Asperg, Germany, assignor to Werner & Pfleiderer, Stuttgart-Feuerbach, Germany, a company of Germany
Filed Oct. 6, 1967, Ser. No. 673,327
Claims priority, application Germany, Nov. 18, 1966, W 42,820
Int. Cl. F16h 25/16; G05g 3/00
U.S. Cl. 74—55                                                    9 Claims

ABSTRACT OF THE DISCLOSURE

A compact, reliable and conveniently serviceable gearing device for converting a rotary movement into a rectilinear reciprocating movement by means of two rotary eccentric members encompassing each other and in which the length of the stroke of the rectilinear movement can be varied by changing the mutual position of the two eccentric members.

The invention relates to a gearing device for converting a rotary movement into a rectilinear reciprocating movement, and more particularly, to a gearing device of this kind in which the length of the stroke is adjustable by varying the position of two members relative to each other.

The problem of converting a uniform or non-uniform rotational movement into a rectilinear reciprocating movement is a well-known one, and several structures have been proposed to obtain such conversion.

There is known, among other devices, a gearing device in which by varying the relative position of two crossstaff heads the length of the stroke of the rectilinear movement can be changed. Such devices and similar devices are not suitable for many purposes, particularly not when it is required to accommodate the components of the gearing device within a limited space without sacrificing the adjustability of the stroke length of the reciprocating movement or the mechanical load capability of the device. Applications where these requirements must be satisfied are, for instance, dosing devices.

It is a broad object of the invention to provide a novel and improved gearing device of the general kind above referred to which combines compactness with very simple adjustability of the stroke length, highly reliable operation and low servicing requirements.

The afore-pointed out object, features and advantages, and other objects, features and advantages which will be pointed out hereinafter are obtained by providing as mutually adjustable members two eccentric members which are mounted in encompassing relationship and driven in opposition. One of the eccentric members, preferably the inner one, is coupled to a driving shaft for rotation by the same and the drive for the outer eccentric member is derived from the inner eccentric member by means of interposed transmission members. The eccentricity of the inner eccentric member and the outer eccentric member are advantageously equal.

An arrangement of two eccentric members in encompassing relationship permits the aforementioned compact structure and driving of the two members in opposition avoids reversal of the movements thereof as occur in known devices of the kind herein referred to, or at least such reversals are reduced to a minimum depending upon the manner in which the rotary movements of the eccentric members are transmitted to a rectilinearly reciprocating member.

The rectilinearly moving member is preferably coupled to the outer eccentric member by a transmission member, for instance, in the form of a connecting rod or coupling link.

The invention also provides to couple each of the eccentric members to a motion transmitting member in the form of a gear and to drive these gears by intermediate gears.

It is also advantageous to provide parallel to a main drive shaft for driving the inner eccentric member an auxiliary shaft which can be swung about the axis of the main drive shaft for the purpose of varying the stroke length of the rectilinearly moving member. As will be pointed out hereinafter, changing the position of the auxiliary shaft causes a corresponding change in the mutual position of the two eccentric members coupled to each other via the aforementioned motion transmission member so that the sum total of the movements of the two eccentric members as transmitted to the rectilinearly moving member is varied as a function of the displacement of the auxiliary shaft.

Instead of using gears for transmitting motion from one eccentric member to the other, chain gears and associated chains or other types of motion transmitting means can also be used to effect a coupling between the two eccentric members.

A particular advantageous arrangement according to the invention is to provide an eccentrically mounted gear coupled to the outer eccentric member, and to arrange this gear in mesh with a gear which is eccentrically seated on the auxiliary shaft. The eccentricity of the gear seated on the auxiliary shaft equals the sum total of the eccentricities of the inner eccentric member and the gear coupled to the outer eccentric member. Such mounting and coupling of the gears result in the superimposition of an oscillating motion upon a uniform rotary motion.

A suitable and practical construction of a gearing device in accordance with the concept of the invention can be obtained by transmitting the driving force from the inner eccentric member to the outer eccentric member by additional gears, one of which is seated on the main drive shaft and secured to the inner eccentric member for rotation in unison therewith and another of which is mounted on the auxiliary shaft and coupled for joint rotation to a gear eccentrically mounted on the auxiliary shaft. The transmission of motion can be effected by a gear train which is in mesh with the gears seated on the main drive shaft and the auxiliary shaft.

As a result of the eccentric mounting of the gear which is coupled with the outer eccentric member, a circularly curved motion of the center point of the outer eccentric member is effected. The center point of this circularly curved path is located in the axis of the rectilinearly moving member in a predetermined spatial position of the auxiliary shaft. If the length of the link coupling the outer eccentric member with the rectilinearly reciprocating member is made equal to the radius of the circularly curved path, an exact zero stroke of the gearing device can be obtained. As mentioned before, the rotation of the two eccentric members in opposition and the use of a connecting rod or link as transmission member between the eccentric members and the rectilinearly moving member result in an elimination of reversal movements within the gearing device for all practical purposes. Such elimination of reversal movements is particularly important with gearing devices in which an accurate adjustment of the stroke length is required. Reversal of moving parts unavoidably causes after more or less prolonged service a highly undesirable play within the gearing device, resulting in a corresponding inaccuracy of the stroke length. As is evident, elimination of reversal movements eliminates the development of such inaccuracy causing play.

In the accompanying drawing, a preferred embodiment of the invention is shown by way of illustration and not by way of limitation.

Figure 1:
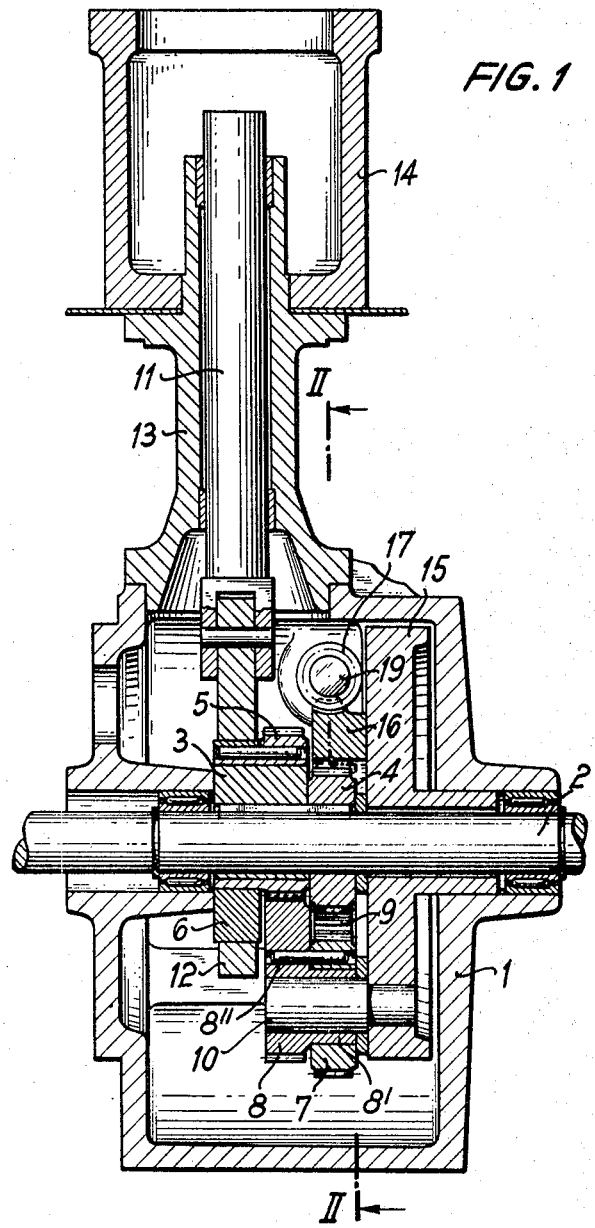
FIG. 1 is an elevational sectional view of a gearing device according to the invention incorporated in a dosing device which is only partly shown.
Figure 2:
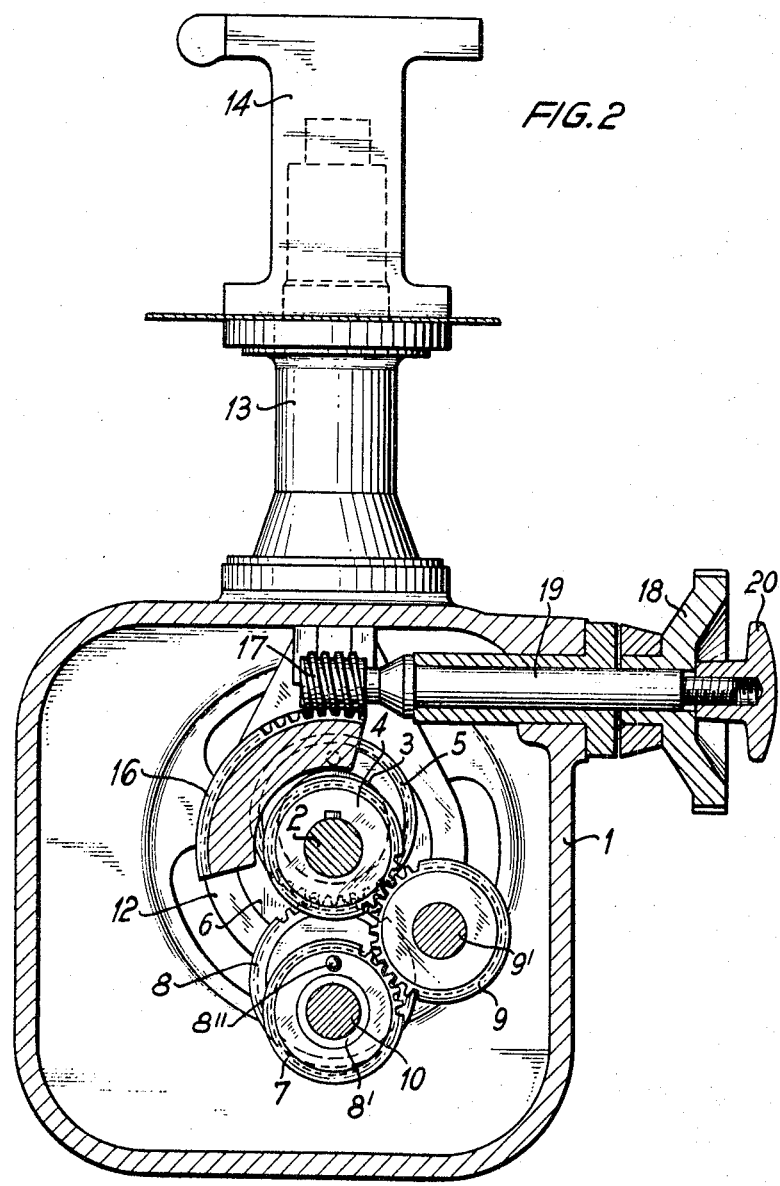
FIG. 2 is a section taken on line II—II of FIG. 1.

The exemplified device comprises a substantially box-shaped casing 1 in which a main drive shaft 2 is rotatably supported. An inner eccentric member 3 and a gear 4 are keyed to the shaft, or otherwise suitably secured thereto for rotation in unison with the shaft. An eccentric gear 5 and an external eccentric member 6 constituting a structural unit are rotatably mounted on the inner eccentric member encompassing the same. The inner eccentric member 3 and gear 4 are driven by shaft 2 and the outer eccentric member 6 and gear 5 are driven via intermediate gears 7, 8 and 9. More specifically, gear 4 drives gear 9 which is rotatable on a shaft 9'; gear 9, in turn, drives gear 7 rotatably seated on an auxiliary shaft 10; gear 7 being rotated in the same direction as gear 5. Gear 7 can be mounted directly on auxiliary shaft 10, or as shown in FIGS. 1 and 2, the gear can be seated on a hub or collar 8' of gear 8 which is also rotatably seated on auxiliary shaft 10. Gears 7 and 8 are coupled by means of a pin 8" to form a structural unit rotatable on shaft 10, gear 8 being disposed eccentrically in reference to the center axis of shaft 10.

The eccentricity of gear 8 is equal to the sum total of the eccentricities of inner eccentric member 3 and gear 5. The latter gear is positively driven by gear 8 so that the rotational direction of gear 5 and outer eccentric member 6 coupled thereto is in opposition to the rotational direction of inner eccentric member 3 and thus also of shaft 2.

To transfer the sum total of the rotations of both eccentric members 3 and 6 to a rod 11 as a rectilinear movement, a transmission member such as a coupling link 12 is coupled on one end to outer eccentric member 6 and on the other end to rod 11. The rod is guided by suitable guide means such as a bushing 13 mounted in casing 1. The bushing extends into an adaptor or connector 14 which should be visualized as part of a utilization device such as a dosing device which is not described or illustrated in detail, as it does not constitute part of the invention.

As is now evident, rod 11 will perform a rectilinearly reciprocating movement when the rotational direction of the two eccentric members is reversed. The length of the strokes of rod 11 is controlled by the effective sum total of the rotation of eccentric members 3 and 6.

To vary the effective angular movements of eccentric members 3 and 6 and thus the length of the strokes of rod 11, a setting member such as a disk 15 is rotatably seated on main shaft 2. The disk mounts shaft 9' and auxiliary shaft 10 and is coupled to a toothed segment 16 which coacts with a worm 17. To vary the angular position of the two eccentric members in reference to each other and thus the effective sum total of the movements of the two eccentric members, a shaft 19 mounting worm 17 is turned by suitable means such as hand wheel 18 to a predetermined angular position.

As is evident, turning of the worm effects a corresponding rotation of setting disk 15 and thus also a corresponding variation of the angular positions of shaft 9', auxiliary shaft 10 and gears 9, 7 and 8. The variation in the positions of these interconnected components results in a corresponding change of the movement transmitted to coupling member 12 and thus of the length of the stroke of rod 11. As is also evident, due to the eccentric mounting of gears 8 and 5 the center point M6 of eccentric member 6 moves along a circular path.

Suitable and conventional locking means 20 may be provided to secure the hand wheel 18 and thus setting disk 15 in the selected position.

Referring now to FIGS. 3 to 6 inclusive, these figures show diagrammatically the positions and movements of the several gears and eccentric members of the device for different operational positions of auxiliary shaft 10. The several rotational directions of the respective components of the device are indicated by arrows.

Figure 4:
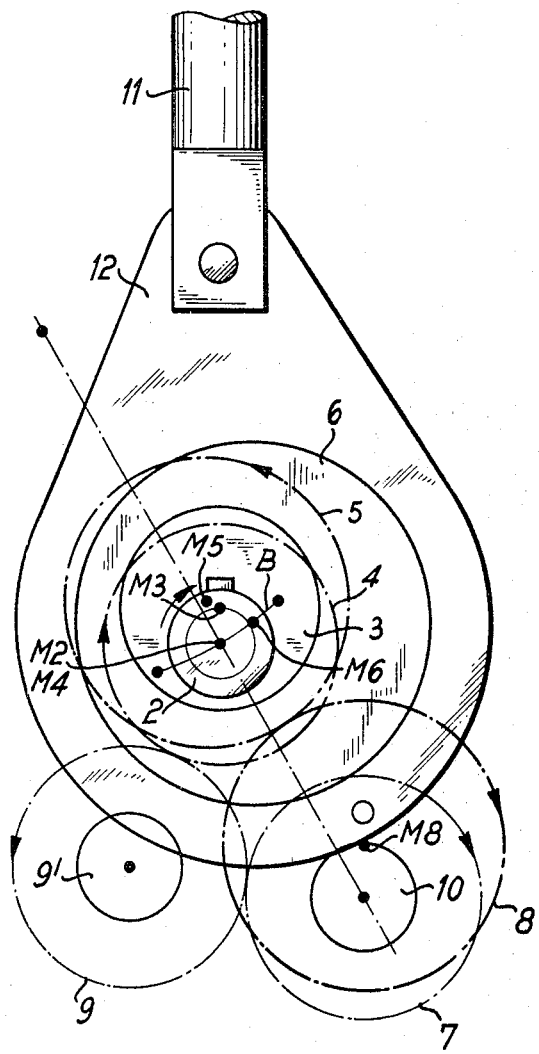
FIGS. 4, 5 and 6 show different positions of the gearing device components as illustrated in FIG. 3.
Figure 5:
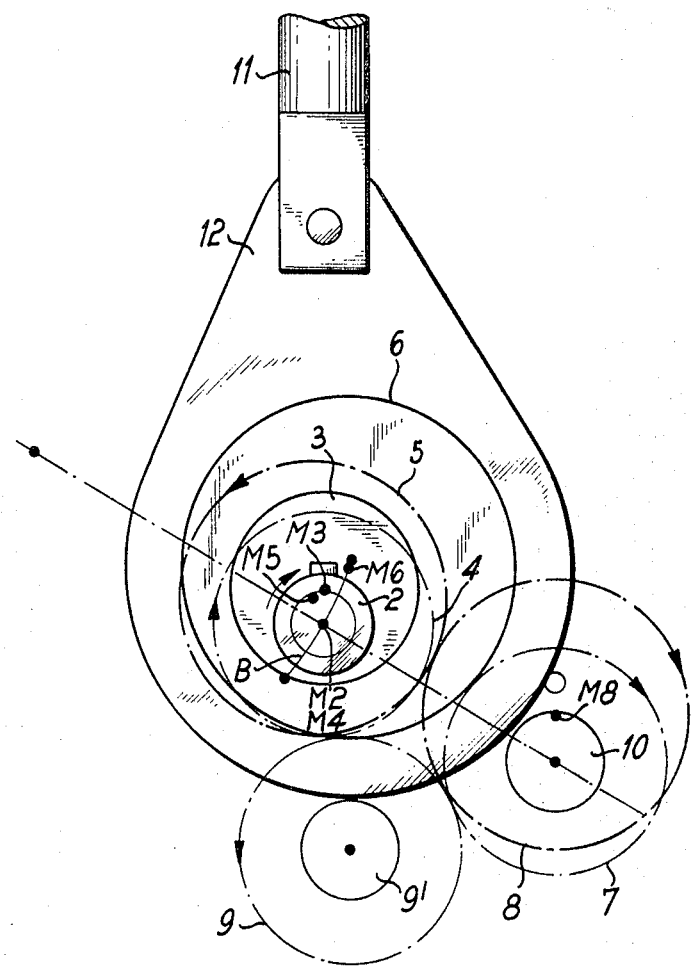
Figure 6:
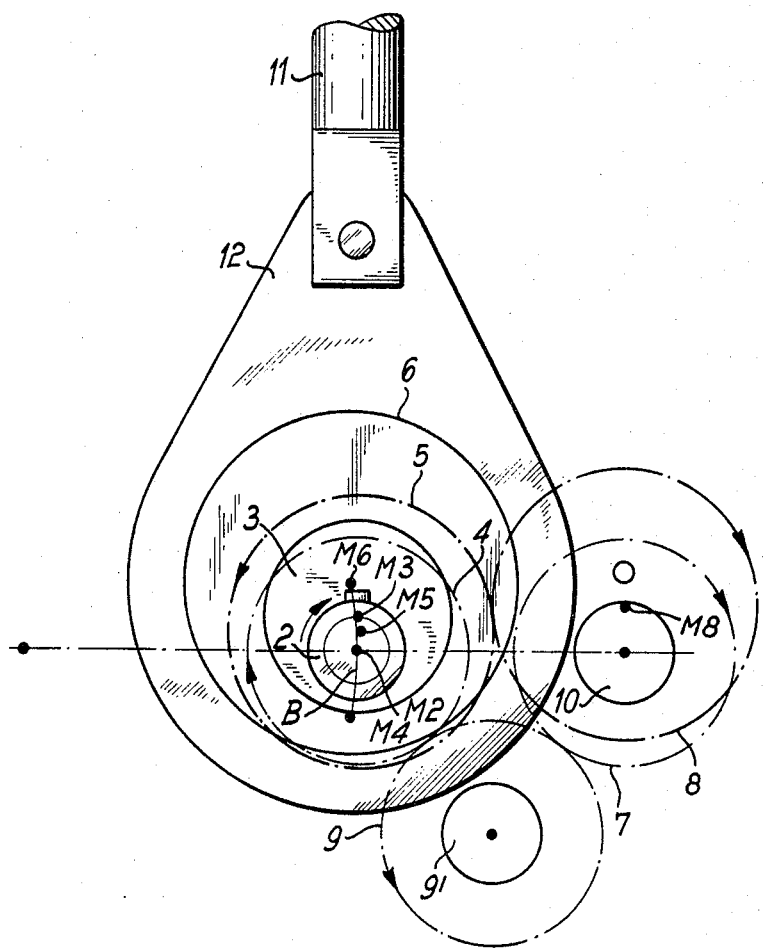

The spatial positions of the center points M2 and M4 of drive shaft 2 and gear 4 respectively, remain unchanged. The center point M3 of inner eccentric member 3 is displaced in reference to center points M2 and M4 by the distance indicated in FIG. 3 and describes a circular movement about points M2 and M4, as will be described hereinafter. As stated before, gear 5 is eccentrically mounted on inner eccentric member 3 and constitutes a structural unit with outer eccentric member 6 rotatable in reference to the inner eccentric member. The locations of the center point M6 of outer eccentric member 6 are shown in FIGS. 4, 5 and 6 for the several illustrated positions of auxiliary shaft 10.

Figure 3:
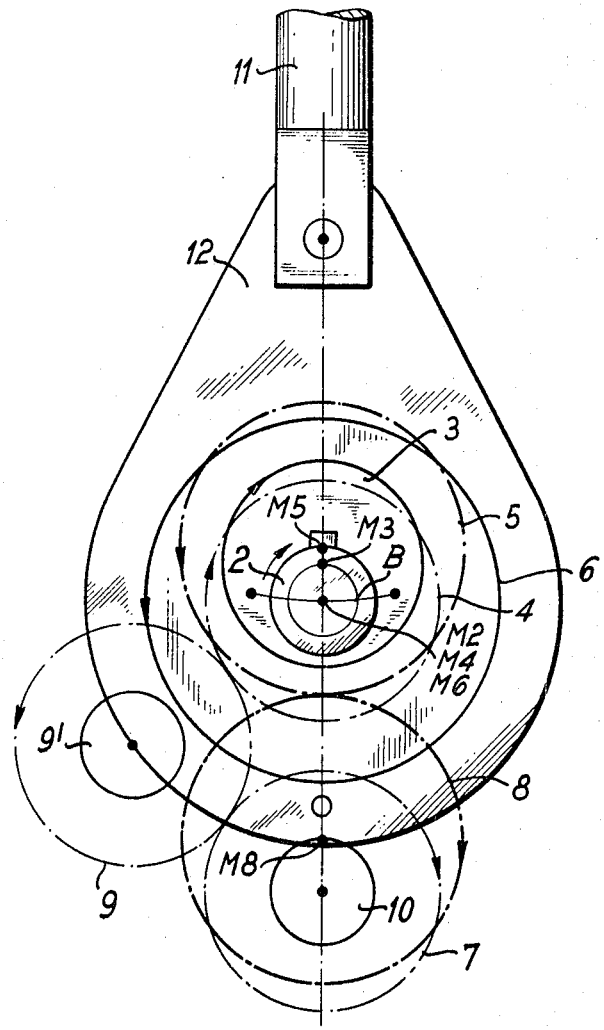
FIG. 3 is a diagrammatic view of the gearing device components of the device in a starting position.

In the position of the gearing device as shown in FIG. 3, center point M6 coincides with center points M2 and M4. When now shaft 2 is rotated in clockwise direction, center point M6 travels along the circular path B. The spatial position of path B in reference to rod 11 is changed by turning shaft 10 resulting in a corresponding turning of outer eccentric member 6 in reference to inner eccentric member 3. In other words, the spatial location of circular path B controls the length of the strokes of rod 11.

The center point M8 of gear 8, the eccentricity of which corresponds to the sum total of the eccentricities of the inner eccentric member 3 and gear 5, is also shown in the drawing. This center point travels along a corresponding circular path about the center axis of auxiliary shaft 10.

Obviously, the concept of the invention is not limited to the illustrated embodiment. Many modifications and changes are possible within the concept of the invention. In particular, the type and the arrangement of the force transmission members and the mounting thereof may be changed. Furthermore, the manner in which the rotational movements of the eccentric members are transmitted to the rectilinearly moving member can be varied. For instance, chain gears and corresponding chains may be used instead of the illustrated gear train. The setting means for varying the length of the strokes of rod 11 or any other rectilinearly moving member can also be changed within the concept of the invention.

What is claimed is:

1. A gearing device for converting a rotational movement into a rectilinear reciprocating movement, said device comprising in combination:

a member (11) supported for rectilinear reciprocating movement;

a pair of rotary eccentric members (3, 6) mounted in encompassing and coacting relationship with each other and angularly adjustable in reference to each other;

transmission means (12) for transmitting the rotational movements of the eccentric members to the rectilinearly moving member so as to impart to the same a rectilinear movement, the length of the strokes of said member being controlled by the angular position of the eccentric members in reference to each other; and drive means coacting with said eccentric members for rotating the same in opposite directions, said drive means including a main shaft (2) having secured thereto the inner one (3) of said eccentric members, and an auxiliary shaft (10) disposed parallel to the main shaft and spatially adjustable in reference to the main shaft, the spatial position of said auxiliary shaft controlling the sum total of the rotational movements of eccentric members transmitted to the rectilinearly moving member thereby changing the length of the strokes of said member.

2. A gearing device according to claim 1 and further comprising coupling means (4, 5, 7, 8, 9) coupling said inner eccentric member to said outer eccentric member (6) for driving the same in opposition to the inner eccentric member upon rotation of said latter member.

3. A gearing device according to claim 1 and further comprising a main shaft (2) fixedly seating the inner one (3) of said eccentric members, and coupling means (4, 5, 7, 8, 9) coupling said inner eccentric member to said outer eccentric member (6) for driving the same in opposition to the inner eccentric member upon rotation of said latter member.

4. A gearing device according to claim 3 wherein said coupling means comprise two gears (4 and 5) each coupled to one of said eccentric members (3 and 6) and additional gears (7, 8 and 9) in mesh with each other and said gears coupled to the eccentric members.

5. A gearing device according to claim 1 wherein said auxiliary shaft (10) is swingable about the rotational axis of the main shaft (2).

6. A gearing device according to claim 5 and further comprising a movable setting member (15) mounting said auxiliary shaft, and actuating means (17, 18, 19) coacting with said setting member for moving the same into a predetermined position thereby correspondingly changing the spatial position of the auxiliary shaft.

7. A gearing device according to claim 1 wherein the outer one (6) of said eccentric members and a gear (5) are mounted as a structural unit in which said gear is eccentrically disposed in reference to said outer eccentric member, and wherein a gear (8) is eccentrically mounted on said auxiliary shaft (10), said gears (5, 8) being in engagement with each other for rotating said outer eccentric member in accordance with the spatial position of said auxiliary shaft.

8. A gearing device according to claim 7 wherein the eccentricity of the gear (8) mounted on the auxiliary shaft is substantially equal to the sum total of the eccentricities of the inner eccentric member (3) and the eccentric gear (5) mounted as a structural unit with the outer eccentric member (6).

9. A gearing device according to claim 1 wherein the rotational axis (M6) of the outer one (6) of the eccentric members moves along a circular path (B) when said outer eccentric member is rotated.

References Cited
UNITED STATES PATENTS 2,592,237  4/1952  Bradley _____ 74—571

FRED C. MATTERN, Primary Examiner

W. S. RATLIFF, Jr., Assistant Examiner

U.S. Cl. X.R.

74—571